United States Patent [19]
Kisner

[11] Patent Number: 5,433,867
[45] Date of Patent: Jul. 18, 1995

[54] ENVIRONMENTALLY FRIENDLY CHLORINE OR BROMINE DISPENSER

[76] Inventor: Kim T. Kisner, 2125 E. Balboa Dr., Tempe, Ariz. 85282

[21] Appl. No.: 181,009

[22] Filed: Jan. 14, 1994

[51] Int. Cl.⁶ ............................................. C02F 1/76
[52] U.S. Cl. ................................. 210/754; 210/169; 210/198.1; 422/274; 422/277; 422/278
[58] Field of Search ............... 210/169, 754, 198.1; 422/274, 276, 277, 278

[56] References Cited

U.S. PATENT DOCUMENTS

| | | | |
|---|---|---|---|
| 2,826,484 | 3/1958 | Buehler | 210/198.1 |
| 2,934,409 | 4/1960 | Biehl | 210/198.1 |
| 3,792,979 | 2/1974 | Clinton | 210/198.1 |
| 3,846,078 | 11/1974 | Brett | 210/198.1 |
| 4,606,893 | 8/1986 | Sangster | 210/198.1 |
| 4,643,881 | 2/1987 | Alexander et al. | 210/198.1 |
| 4,781,897 | 11/1988 | Geron et al. | 210/198.1 |

*Primary Examiner*—Neil McCarthy
*Attorney, Agent, or Firm*—Christopher Klein

[57] ABSTRACT

This invention discloses a device that provides the most effective means or method of dispensing a strong stabilized such as Chlorine or Bromine in the form of tablets, stick or granules to sanitize water in a contained vessel such as swimming pool, spa, or in a recirculating water system such as cooling tower, fountain, or water reservoir. This device contains stabilized chlorine or bromine tablets, sticks or granules, and sinks to the bottom of the water contained vessel. There it release chlorine or bromine into the water from the bottom of the water containing vessel without losing any chlorine or bromine into the atmosphere.

14 Claims, 2 Drawing Sheets

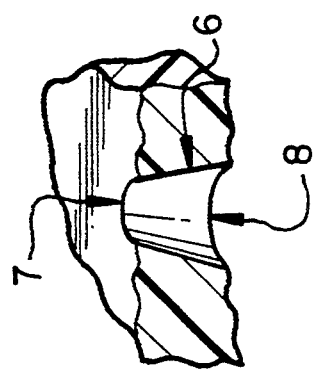
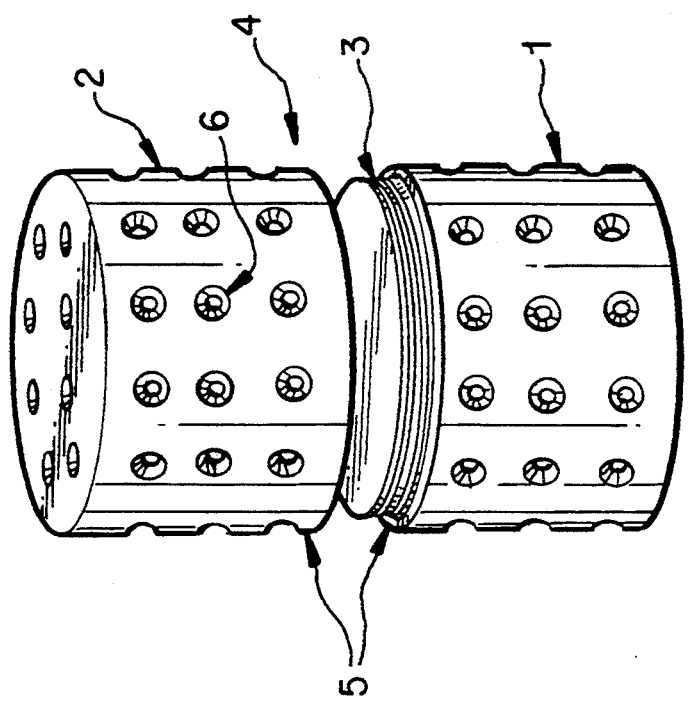

ENVIRONMENTALLY FRIENDLY CHLORINE OR BROMINE DISPENSER

BACKGROUND OF THE INVENTION

1. Field of the Invention

The present invention relates to maintaining the proper level of chlorination throughout the entire body of water contained in a swimming pool, spa, or recirculation water systems such as cooling tower, fountain or pond. More specifically, the present invention pertains to a rigid, non-mechanical device which acts as a container and dispenser to release stabilized Chlorine or Bromine or other water treatment chemicals in the form of tablets, sticks, or granules from the bottom of the water container vessels without losing or dissipating any chlorine or bromine into the air.

2. Brief Description of the Prior Art

Current pool care products sold to the growing pool owner population fail to take into account the issue of pollution of our water supply and our atmosphere. Because of the inefficient water surface application using the currently popular floating dispensing device for chlorine or bromine, the majority of chlorine simply dissipates into the atmosphere, polluting our air and having no effect on the water in the lower part of the pool. Then when liquid chlorine or shock treatment products are added to the pool to try to compensate for the lack of effect of this chlorination method, both calcium and sodium are added along with this new chlorine. These by-products remain in the pool water after the chlorine has evaporated, polluting our water resources with backwashing polluted pool water. This floating dispensing method is also a health hazard to swimmers.

Prior art discloses several methods for time-released application of chlorine to pool water via a floating dispenser as in U.S. Pat. Nos. 5,053,205; 4,917,868; 4,828,805; 4,828,803; 4,825,528; 4,798,707; 4,463,881; 4,630,634; 4,606,893; Des. 309,493; Des. 286,560 and Des. 275,311, or a dispenser in-line for use with 3-inch tablets as in U.S. Pat. Nos. 5.133.381; 4,867,196; 4,303,515; 4,208376; or in 4,420,394, a dispenser integral to the pool pump for use of chlorine granules.

The present invention provides a container and non-mechanical dispenser unit that sinks to the bottom of the pool and acts to release the chlorine or bromine at a constant rate and so allows the chlorine or bromine to dissipate throughout the entire depth of the pool water, thus providing the chlorine every opportunity to react with any organic contents found in the pool water.

BRIEF SUMMARY OF THE INVENTION

It is an object of this invention to provide the most effective and economical method of dispensing stabilized chlorine or bromine tablets, slicks, or granules to the water of a recirculating water vessel or system from the bottom of the vessel or container to avoid any possible dissipation or loss of chlorine or bromine into the atmosphere to deplete the oxygen content in the air.

It is a further object of this invention to provide a rigid, non-mechanical container and dispenser for use with chlorine or bromine tablets, sticks, or granules to provide an effective method for the chlorination of a swimming pool, spa, or recirculating water systems.

BRIEF DESCRIPTION OF THE DRAWINGS

FIG. 1 is a front view showing the cylinder slightly separated into its two like-sized halves.

FIG. 2 is a cross-sectional close-up of the conical cylinder wall hole.

DETAILED DESCRIPTION OF THE INVENTION

Figure 4:
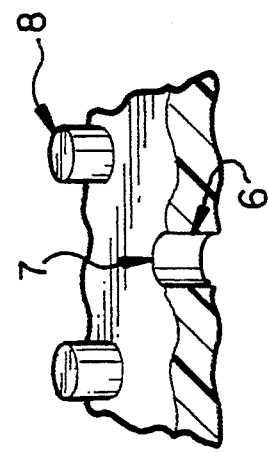
FIG. 4 is a cross-sectional close-up of the cylindrical cylinder wall hole and blunt spike system.

The present invention provides a method and device for dispensing a strong oxidizer such as chlorine or bromine from under the water, specifically from the bottom of a water contained vessel, a swimming pool in particular. This device is comprised of a cylindrical container with a permanent top and bottom face. The cylinder separates at its mid-length into two like-sized halves to provide a means to insert the contents. One half of the cylinder is selected to be filled, and once filled, the two halves are joined and locked together by a screw thread system. The unit is then placed into the pool water where it sinks to the bottom of the pool. The cylinder has a regular number of holes passing completely through its walls, and as the cylinder fills with water, the chlorine or bromine begins to dissociate into the pool water. The chlorine then moves out from the dispenser by diffusion into the pool water, acting to chlorinate the water from the bottom of the pool upward to the surface of the pool. The dispenser may be constructed of non-metal materials, preferably plastic such as polyvinyl chloride (PVC), or polyvinyl acetate (PVA) to avoid the oxidation or the deterioration of the container.

Referring now to the figures FIG. 1 is a front view showing the cylinder slightly separated into its two halves, the lower half 1 and the upper half 2. The dispensing holes 6 pass completely through the cylinder 1 & 2, and are seen as occurring at a regular interval around the circumference of the cylinder and in several rows. The threads 3 can be seen on one cylinder half and correspond to the male mating surface. The threads 4 on the other cylinder half are internal and correspond to the female mating surface. The threads 3 on cylinder half 1 are joined at intersection 5 with the threads 4 on cylinder half 2, and are locked with a clock-wise rotation of cylinder half 1 with respect to cylinder half 2 until tight.

Referring now to FIG. 2 we see a cross-sectional close-up of the dispensing hole 6, which demonstrates the small inner cylinder wall dispensing hole diameter 7 and the larger outer cylinder wall dispensing hole diameter 8 that characterizes the conical shape of the hole. Dispensing hole diameter 7 shall be no more than 3/32 of an inch to allow for the use with granules of chlorine or bromine while preventing the granules from passing through the dispensing hole 6.

Figure 3:
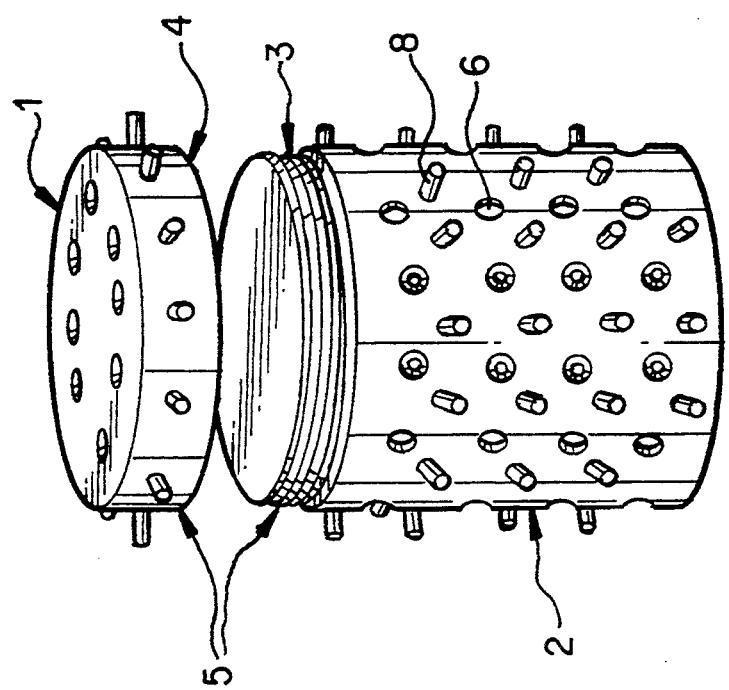
FIG. 3 is a front view showing a second style of cylinder slightly separated into its two unlike-sized halves.

Referring now to FIG. 3 we see a front view showing the cylinder slightly separated into its two portions, the upper portion 1 and the lower portion 2. The dispensing holes 6 pass completely through the cylinder 1 & 2, and are seen as occurring at a regular interval around the circumference of the cylinder and in several rows. The cylindrical projections 8, or blunt spikes 8, occur on the container wall in such a way as to alternate with the cylinder wall holes and act to prevent the wall of the container from contacting the surface of the water containing, vessel to provide a reduced concentration of strong oxidizer solution at the water vessel surface to avoid staining of the water vessel's surface. The threads 3 can be seen on one cylinder portion and correspond to the male mating surface. The threads 4 on the other cylinder portion are internal and correspond to the female mating surface. The threads 3 on cylinder portion 1 are joined at intersection 5 with the threads 4 on cylinder portion 2, and are locked with a clock-wise rotation of cylinder portion 1 with respect to cylinder portion 2 until tight.

Referring now to FIG. 4 we see a cross-sectional close-up of a dispensing hole 6 and a cylindrical projection 8, which demonstrates one system wherein the dispensing hole and the cylindrical projection alternate as part of a regular pattern. Dispensing hole diameter 7 shall be no more than 3/32 of an inch to allow for the use with granules of chlorine or bromine while preventing the granules from passing through the dispensing hole 6.

The thickness of the cylinder walls will be dependent on the material chosen, and shall be of such a dimension so as to provide adequate strength for its purpose. The volume of the cylinder, and its dimensions will vary according to the particular needs of the user, and so shall vary according to such factors as water containing vessel size, the size of the tablets, sticks, or granules, the time of year, and the desired duration of chemical release, as well as any other user needs that may be fulfilled by this chemical treatment method or device. For the present invention in the preferred embodiment, the dispensing holes will be of a conical shape and will extend outward from 1/16 of an inch diameter on the inner cylinder face into a 3/16 of an inch diameter on the outer cylinder face, with a wall thickness of approximately ¼ of an inch. The dispensing holes shall occur regularly, and as is required to optimize the release of the chemicals into the water, neither too quickly nor too slowly. The preferred embodiment shall have an approximately 3 inch height on each cylinder half and shall have a diameter of approximately 4 inch. To remove the present invention from the pool or other water contained vessel, a net device will be used in a similar manner as for retrieving current pool care devices.

The aforementioned description of the present invention in the preferred embodiment is the most practical and cost-effective means of maximizing the effectiveness of the chlorination process for large, water containing vessels, like swimming pools, spas, and recirculating water systems such as cooling towers, city fountains or ponds. The present invention is simple, as those skilled in the art will recognize. The disadvantages of prior art, such as: failure to effectively chlorinate the entirety of the body of water, the leaving of inert elements in the water after each dose of chlorine has dissipated, are completely eliminated by the present invention. Those skilled in the art will appreciate that the present invention can be modified and therefore is not limited to the aforementioned details but encompasses any and all equivalent apparatus or arrangements covered under the following claims.

What is claimed is:

1. An apparatus for dispensing a pool water treatment chemical comprising:

a container separable into two parts by a screw thread system, each of said parts defining a volume for containing a pool water treatment chemical;

said container having a plurality of sides, each side having an inner container face and an outer container face;

said sides having a plurality of dispensing holes and a plurality of projections in an alternating pattern with said dispensing holes;

said projections extending from the sides of said container in a manner so as to prevent the sides of the container from contacting a surface of a pool;

said dispensing holes extending completely through said sides and being sized to allow water to enter said volume for containing said pool water treatment chemical and for allowing water containing dissolved treatment chemical to diffuse out of said dispensing holes; and said container comprised of a material that permits said container to sink to the bottom of said pool when said treatment chemical is placed therein, and that permits said container to float in said pool when said treatment chemical is fully dissolved.

2. The apparatus of claim 1 wherein said container is cylindrical in shape.

3. The apparatus of claim 1 wherein said container is comprised of polyvinyl chloride.

4. The apparatus of claim 1 wherein said container is comprised of polyvinyl acetate.

5. The apparatus of claim 1 wherein said dispensing holes are conical in shape and extend outward from 1/16 of an inch diameter on the inner container face into a 3/16 of an inch diameter on the outer container face.

6. The apparatus of claim 1 wherein said container sides are approximately ¼ of an inch in thickness.

7. A method for dispensing a pool water treatment chemical, said method comprised of:

providing a pool water treatment chemical dispensing apparatus, said apparatus comprised of a container separable into two parts by a screw thread system, each of said parts defining a volume for containing a pool water treatment chemical;

said container having a plurality of sides, each side having an inner container face and an outer container face;

said sides having a plurality of dispensing holes and a plurality of projections in an alternating pattern with said dispensing holes;

said projections extending from the sides of said container in a manner so as to prevent the sides of the container from contacting a surface of a pool;

said dispensing holes extending completely through said sides and being sized to allow water to enter said volume for containing said pool water treatment chemical and for allowing water containing dissolved treatment chemical to diffuse out of said dispensing holes; and said container comprised of a material that permits said container to sink to the bottom of said pool when said treatment chemical is placed therein, and that permits said container to float in said pool when said treatment chemical is fully dissolved;

providing a pool water treatment chemical;

placing said pool water treatment chemical into said container; and placing said container containing said pool water treatment chemical into said pool.

8. The method of claim 7 wherein said pool water treatment chemical is chlorine.

9. The method of claim 7 wherein said pool water treatment chemical is bromine.

10. The method of claim 7 wherein said container is cylindrical in shape.

11. The method of claim 7 wherein said container is comprised of polyvinyl chloride.

12. The method of claim 7 wherein said container is comprised of polyvinyl acetate.

13. The method of claim 7 wherein said dispensing holes are conical in shape and extend outward from 1/16 of an inch diameter on the inner container face into a 3/16 of an inch diameter on the outer container face.

14. The method of claim 7 wherein said container sides are approximately ¼ of an inch in thickness.

* * * * *